July 4, 1950

L. RIEBMAN 2,513,968

SUPERREGENERATOR

Filed Nov. 4, 1947

INVENTOR.
LEON RIEBMAN

BY

Allen V. Hazeltine

AGENT

Patented July 4, 1950

2,513,968

UNITED STATES PATENT OFFICE 2,513,968

SUPERREGENERATOR

Leon Riebman, Philadelphia, Pa., assignor to Philco Corporation, Philadelphia, Pa., a corporation of Pennsylvania Application November 4, 1947, Serial No. 783,981

5 Claims. (Cl. 250—20)

Figure 1:
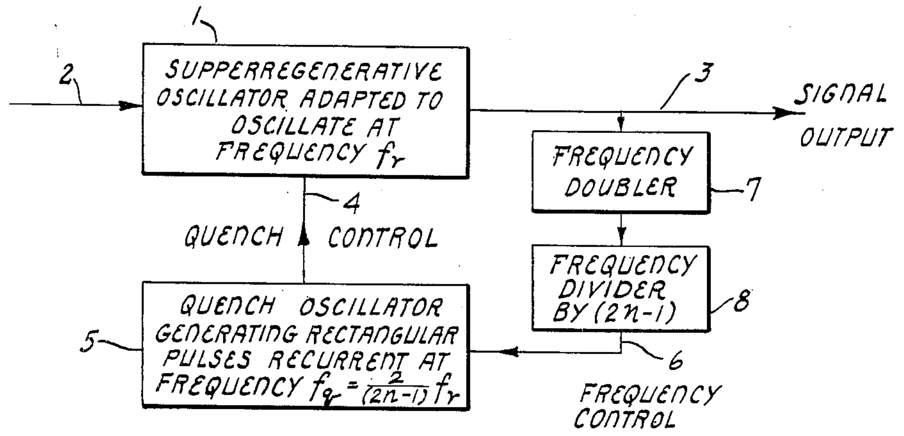

The invention herein described and claimed relates to improvements in superregenerative oscillators such as are adapted to be used, for example, in the reception and amplification of electrical wave signals.

For the purposes of this specification, a superregenerative oscillator may be regarded as consisting of an oscillatory circuit adapted to oscillate at a relatively high frequency, said oscillator being normally quenched or controlled in a manner to inhibit the build-up of oscillations therein, and adapted to be controlled or unquenched intermittently in a manner to permit oscillations to build up therein, and said oscillator being adapted to be supplied with an input signal of relatively lower frequency, said input signal being adapted to control and determine the nature (e. g. the rate) of build-up of oscillations in said circuit, and said oscillatory circuit being provided with means for deriving an amplified output signal which varies in accordance with the variations in the oscillations in said oscillatory circuit and therefore in accordance with the variations in a predetermined characteristic of said input signal.

In superregenerative oscillatory circuits of the sort just defined, it is customary to select the frequency of unquenching so that it lies somewhere between the highest intelligence frequency component contained in the input signal and the frequency of oscillation of the superregenerative oscillator circuit. The frequency of unquenching must not be made too low or it will tend to produce a component of that frequency in the output signal derived from the oscillator and, when the latter signal is detected, as is customary, to yield an amplified version of the original intelligence signal, a component of this frequency will be present in the detected signal, which will usually prove to be objectionable. On the other hand, the frequency of unquenching must not be made too high; otherwise there will be an increased tendency to shock-excite the resonant tank circuit normally included in the superregenerative oscillator and thereby produce spurious and undesirable frequency components in the output of the superregenerative oscillator. In general, this tendency toward shock excitation will become greater as the frequency of unquenching approaches the frequency of oscillation. It will be noted that these factors will have a tendency to restrict the range of choice in the selection of the unquenching frequency. This may prove to be of considerable disadvantage, inasmuch as it has been found possible, by increasing the unquenching frequency, to increase the selectivity and amplifying capability of the superregenerative oscillator when used as a receiver of radiated high frequency signals. This may be desirable in numerous applications.

It is the primary object of this invention to provide methods of and means for avoiding this apparent limitation with regard to the selection of the unquenching frequency in a superregenerative oscillator circuit, and thereby to make possible the achievement of better selectivity, higher amplification and other advantages which will become apparent hereinafter.

According to the invention this limitation is avoided and at the same time the tendency toward shock excitation of the superregenerative oscillator circuit is avoided, even though, in accordance with the invention, the frequency of unquenching may lie much closer to the frequency of oscillation of the superregenerative circuits than in conventional superregenerative oscillators according to the prior art.

Figure 2:
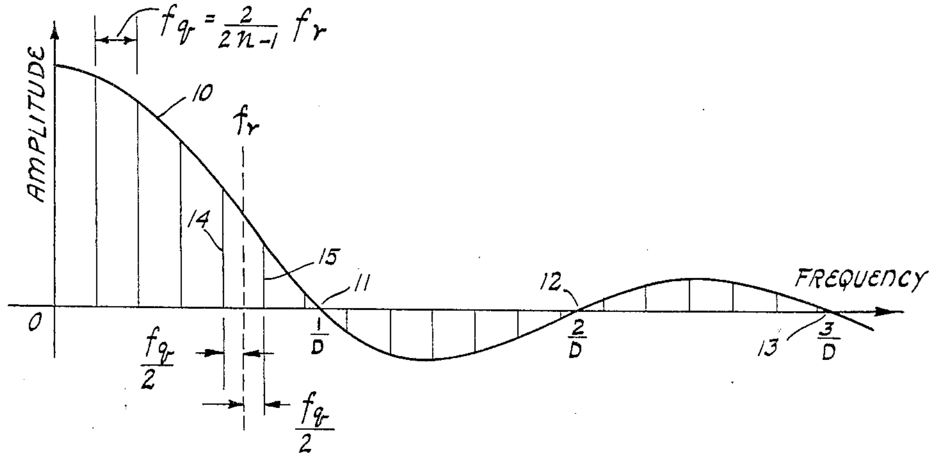

These objectives are achieved, according to the invention, by judicious selection of the frequency of recurrence of the intervals during which the oscillator is unquenched. More specifically the frequency of unquenching is made equal to $$\frac{2}{2n-1}$$

times the frequency of oscillation of the superregenerator, $n$ being a positive integer greater than one. The reasons for this, as well as other features and advantages of the invention will become apparent from consideration of the following detailed description of a representative embodiment of the invention and by reference to the drawings in which: Fig. 1 is a block diagram of a superregenerative oscillator system according to the invention, and Fig. 2 is an explanatory diagram to which reference will be made in explaining the method and principle of the invention and the manner in which the frequency of recurrence of the unquench intervals is selected.

For convenience in description and in explaining the principles of the invention, the invention will be described with reference to a superregenerative oscillator arrangement employing a separate quench signal source or generator. It is to be understood however that the invention is likewise applicable to superregenerators of the self-quenched type in which the quench oscillator forms a part of the superregenerator itself and may utilize certain components in common therewith, as for example, in the form of oscillator shown and described in copending application Serial No. 662,418 of Joseph C. Tellier, filed April 16, 1946, and relating to a Superregenerative Oscillator.

Referring now to Fig. 1 there is shown a superregenerative oscillator 1 which is normally quenched so that no oscillations exist therein; but which is adapted to be unquenched during certain intervals in response to a quench control signal supplied to it through connection 4 from a quench oscillator 5 so that, during these certain unquenched intervals, oscillations will tend to build up in superregenerative oscillator 1 at a predetermined frequency $f_r$ determined by the values of the parameters of circuits comprising the superregenerative oscillator. Superregenerative oscillator 1 is adapted to be supplied through connection 2 with an input signal which will be effective to control the nature of the build-up of oscillations in the superregenerative oscillator during its unquenched intervals. More specifically, in the usual form of superregenerative oscillator, the value of this input signal, at the commencement of a particular unquenched interval, will determine the rate at which oscillations will build up in the superregenerative oscillator during the unquenched interval. When, for example, the superregenerator is utilized in a radio or like receiver, the input signal supplied through connection 2 may be a modulated radio frequency carrier wave signal intercepted by the receiving antenna, which, in certain instances, may be amplified before being supplied to the superregenerative oscillator. There is also provided a connection 3 for deriving output signal from the superregenerative oscillator 1, which signal will comprise oscillations at the superregenerative oscillator frequency $f_r$, which vary in amplitude in response to the variations in the modulation envelope of the input signal supplied through connection 2.

The detail circuits comprising superregenerative oscillator 1 have not been illustrated since the invention is broadly applicable to superregenerators generally, of which there are a multitude of forms—all operating on the same basic principle. From the following discussion it will be apparent to anyone skilled in the art, to which this invention appertains, how to proceed in applying the principles of the invention to any form of superregenerator.

Quench oscillator 5 likewise may be any well-known form of oscillator adapted to generate periodically recurrent pulse signals. In accordance with the invention it is adjusted to generate pulses which are periodically recurrent at a frequency $f_q$ substantially equal to $$\frac{2}{2n-1}$$

times the frequency of oscillation $f_r$ of the superregenerative oscillator, where $n$ is a positive integer greater than 1. The reasons for utilizing unquenching pulses recurrent at a frequency thus related to the frequency of oscillation of superregenerative oscillator 1 will presently become apparent. The polarity of these pulses should be such that, when applied through connection 4 to superregenerative oscillator 1 in a predetermined manner, they will effect unquenching of the superregenerative oscillator during intervals coextensive with their occurrence.

Preferably the unquenching frequency $f_q$ is controlled in response to the output from superregenerative oscillator 1, which may be supplied through connection 6 to quench oscillator 5 to control its frequency in any of the well-known ways customarily employed to effect such control. To this end, connection 6 may include first a frequency doubler 7 supplied with the output from superregenerative oscillator 1. The output from doubler 7 is in turn supplied to the input of a frequency divider 8, the latter being adapted to divide the doubled output frequency from superregenerative oscillator 1 by $2n-1$, where $n$ is a positive integer greater than 1. Thus, the net effect of frequency doubler 7 and frequency divider 8 will be to produce a signal whose frequency is equal to $$\frac{2}{2n-1}$$

times the frequency of the output signal from superregenerative oscillator 1. This signal is suitable for supply to quench oscillator 5 to control the recurrence frequency $f_q$ of the unquenching pulses generated thereby to the desired value. Frequency doubler 7 and frequency divider 8 may be of any suitable conventional form.

The considerations involved in the selection of the frequency of recurrence of unquenching pulses in the quench control signal will now be discussed with reference to Fig. 2. In general, the unquenching signal will comprise a spectrum consisting of a plurality of discrete, harmonically related components as represented by the equally spaced vertical lines in the diagram of Fig. 2, where the positions of the equally spaced vertical lines indicate the locations of the components along the horizontally disposed frequency axis and their lengths indicate the relative magnitudes of the several components. The envelope 10 defining the amplitude of the several components is specified by the expression $$A=\frac{\sin \pi f D}{\pi f D}$$

where $f$ is the frequency of an individual component and D is the unquenching pulse duration. It will be noted that this envelope crosses and recrosses the frequency axis at points 11, 12, 13 at which the values of $f$ in the above equation are equal to a positive integer divided by the duration D of the unquenching pulses.

From this graph it will be seen that the superregenerative oscillator frequency $f_r$ can be selected to lie intermediate between any two adjacent components of the quench signal spectrum. As illustrated, it is selected to lie between those components represented by lines 14 and 15 in the diagram, which represent respectively the fourth and fifth harmonics of the fundamental quench control signal frequency. The relation between the superregenerative oscillator frequency $f_r$ and the fundamental frequency of the quench control signal of the fundamental frequency $f_q$ of the quench control signal is given by the expression $$f_q=\frac{2}{2n-1}f_r$$

where $n$ is a positive integer which, in general, should be greater than 1, if, as is customary, the frequency of oscillation of the superregenerator is to be greater than the fundamental frequency of the quench control signal.

Thus, if the superregenerative oscillator frequency has already been specified, the above relation may be used to determine various possible values of the fundamental quench frequency. On the other hand, if the quench frequency is first specified, the relation may be utilized in a similar manner to determine the various possible values of the superregenerative oscillator frequency $f_r$, which are feasible according to the invention. In any event, if the frequency of oscillation of the superregenerator and the quench frequency are selected in a manner to satisfy this relation, the superregenerative oscillator frequency will be equally spaced with respect to the adjacent components of the quench control signal by an amount equal to one-half the fundamental quench frequency as illustrated in Fig. 2, and the tendency toward shock excitation of the superregenerative oscillator circuit will be substantially reduced.

It is appropriate to mention that, so far as the present invention is concerned, there is no restriction on the form of quench control signal which may be used, since any periodically recurrent waveform is resolvable into a spectrum of discrete, harmonically related components spaced by the frequency of recurrence. However it is also true that certain quench waveforms will yield improved results over others (e. g. in respect of sensitivity and bandwidth). Accordingly the invention contemplates that particular control signal waveforms may be selected in accordance with known principles to satisfy specific requirements other than those with which the present invention is concerned.

I claim:

1. In combination, a normally quenched superregenerative oscillator, means for unquenching said oscillator substantially periodically during intervals recurrent at a frequency substantially equal to $$\frac{2}{2n-1}$$

times the frequency of oscillation of said superregenerative oscillator, where $n$ is a positive integer greater than 1, and means for deriving from the output of said oscillator a signal which is dependent upon the oscillations in said oscillator.

2. A combination according to claim 1 including, in addition, means responsive to the output of said superregenerative oscillator for controlling said unquenching means to maintain said recited relationship between the frequency of unquenching and the frequency of oscillation of said oscillator.

3. In combination, a normally quenched superregenerative oscillator, a quench oscillator adapted to generate an unquenching signal comprising pulses recurring substantially periodically at a frequency substantially equal to $$\frac{2}{2n-1}$$

times the frequency of oscillation of said superregenerative oscillator, where $n$ is a positive integer greater than 1, means for supplying said unquenching signal generated by said quench oscillator to said superregenerative oscillator to unquench said superregenerative oscillator during intervals substantially coextensive with said pulses generated by said quench oscillator, and means for deriving from the output of said superregenerative oscillator a signal which is dependent upon the oscillations in said superregenerative oscillator.

4. A combination according to claim 2 in which said additional means responsive to the output from said supperregenerative oscillator comprises means for deriving a signal whose frequency is substantially equal to $$\frac{2}{2n-1}$$

times the frequency supplied to it, where $n$ is a positive integer greater than 1.

5. A combination according to claim 2 in which said additional means responsive to the output from said superregenerative oscillator includes a frequency doubler supplied with the output from said superregenerative oscillator, and a frequency divider supplied with the output from said frequency doubler and adapted to divide said last-named output in frequency by $2n-1$, where $n$ is a positive integer greater than 1.

LEON RIEBMAN.

REFERENCES CITED

The following references are of record in the file of this patent:

UNITED STATES PATENTS

| Number | Name | Date |
|---|---|---|
| 2,039,657 | Osborne | May 5, 1936 |
| 2,076,168 | Turner | Apr. 6, 1937 |
| 2,317,474 | Montgomery | Apr. 27, 1943 |
| 2,363,571 | Chaffee | Nov. 28, 1944 |
| 2,363,651 | Crosby | Nov. 28, 1944 |
| 2,460,202 | Tyson | Jan. 25, 1949 |

OTHER REFERENCES

"Basic Principles of Super-Regenerative Reception," January 1938, by Frink, Proc. I. R. E., vol. 26, No. 1.